Nov. 23, 1954     A. S. WHEELBARGER     2,694,936
VARIABLE REDUCTION GEAR MECHANISM
Filed Feb. 23, 1951     2 Sheets-Sheet 1
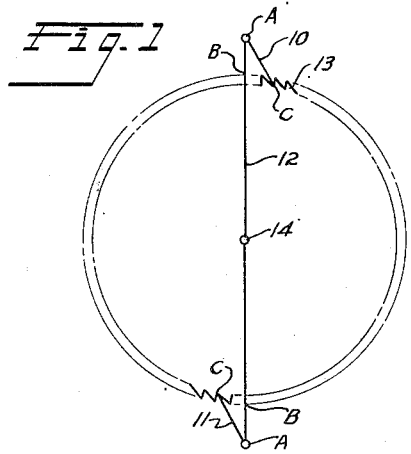
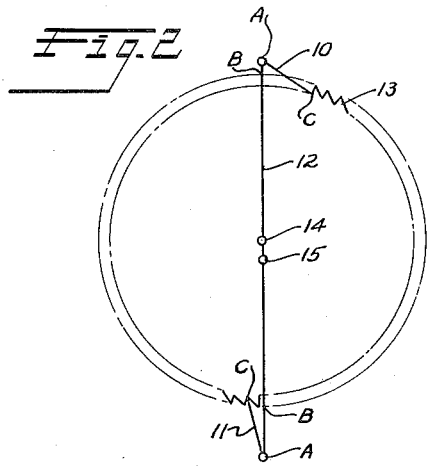
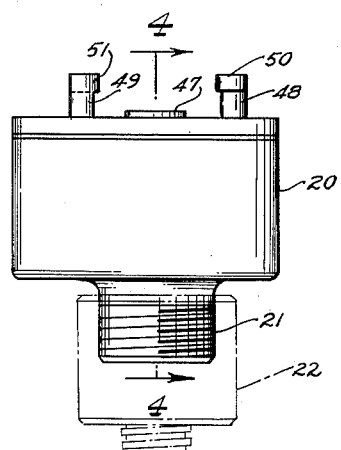
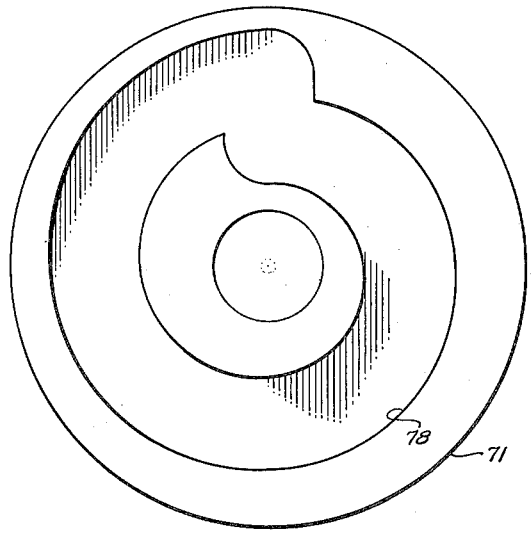
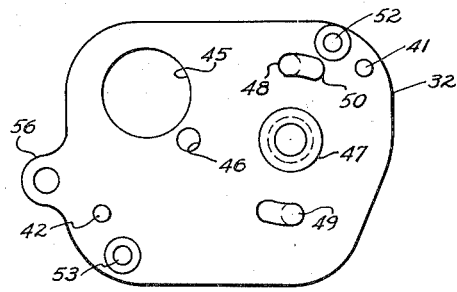
INVENTOR
ALBERT S. WHEELBARGER
BY *Strauch, Nolan + Diggins*
ATTORNEYS Nov. 23, 1954  A. S. WHEELBARGER  2,694,936
VARIABLE REDUCTION GEAR MECHANISM
Filed Feb. 23, 1951  2 Sheets-Sheet 2

INVENTOR
ALBERT S. WHEELBARGER

BY Strauch, Nolan & Diggins
ATTORNEYS

United States Patent Office 2,694,936
Patented Nov. 23, 1954

2,694,936

VARIABLE REDUCTION GEAR MECHANISM

Albert S. Wheelbarger, Dayton, Ohio, assignor to Rockwell Register Corporation, a corporation of New York Application February 23, 1951, Serial No. 212,349

7 Claims. (Cl. 74—112)

This invention relates to variable ratio drive mechanism and has for its general object and purpose to provide simple and efficiently operating means for producing small increments of driving speed change which is positively driven in the same direction of rotation as the driving shaft.

One of the prominent features of the present invention is the provision of easily and quickly operable means for effecting and retaining a predetermined adjustment of the speed changing means, to consistently establish a desired driving speed ratio to which the mechanism is adjustably fixed over long running periods, so that the invention is particularly adapted for use in connection with taximeters.

In the operation of taximeters certain allowable deficiency or excess tolerances on distances computed or actually travelled by the motor vehicle are established by local licensing bureaus. To establish such a tolerance of plus or minus five percent requires extensive trials with tires, as there is a difference between tires which are nominally identical in all respects, but made by different manufacturers. Heretofore the compensating adjustment for various tire sizes has been made by interchanging and interposing suitable gears between the meter drive shaft and the reduction gear box connected with the transmission outlet for the speedometer.

Automobile manufacturers have acquired speedometer accuracy within a very small percentage of error by adopting one thousand revolutions per mile as standard for speedometer requirements at a certain specified speed. Assuming such an actual condition, a choice must then be made between a worm and worm gear combination of standard size of either 16.5 to 1 or 17 to 1 ratio to produce in the neighborhood of 60 revolutions per mile at the meter. It is then found that in either case a choice of gear boxes is required with additional calibration to arrive at the required 60 revolutions per mile at the meter head, which can be solved either by an additional gear train or by changing the tires and the degree of inflation thereof to induce a one percent gain in the case of the 16.5 to 1 ratio and a two percent loss for the 17 to 1 ratio gear box.

In view of the above noted requirements for taximeters, it is a further important object of my invention to provide a variable ratio drive mechanism for a taximeter which avoids the troublesome factor of non-uniformity in automobile tire sizes and eliminates the necessity for interposing additional gear trains in the driving connections.

A further object of the invention is to provide a new and improved variable ratio drive mechanism as above characterized which obviates the operating inefficiencies common to friction drive mechanisms.

An additional object of the invention resides in the provision of a simple and highly compact assembly of the drive mechanism and its adjusting means which eliminates the necessity of providing means compensating for reverse motion and wherein the speed advancing means rotates about a common axis and in the same direction as the driving shaft.

While the present invention is primarily designed for use in connection with a gear reduction box for taximeters, it will become apparent from the following description that the invention is also applicable for use in various other analogous fields, where an easily and quickly adjustable variable ratio driving mechanism may be required.

With the above and other objects in view, the invention comprises the improved variable ratio drive mechanism, the construction and relative arrangement of its several parts, as will hereinafter be more fully described, being illustrated in the accompanying drawings and subsequently incorporated in the sub-joined claims.

In the drawings wherein I have disclosed one simple and practical embodiment of the invention, and in which similar reference characters designate corresponding parts throughout the several views:

Figures 1 and 2 are diagrammatic views illustrating the basic principle of operation of the present invention;

Figure 3 is an end elevation of a gear box adapted for connection with a taximeter housing, and in which the component elements of the drive mechanism are contained;

Figure 7 is a bottom plan view of the adjusting cam; and

Figure 8 is a top plan view of the gear box cover.

Figure 4:
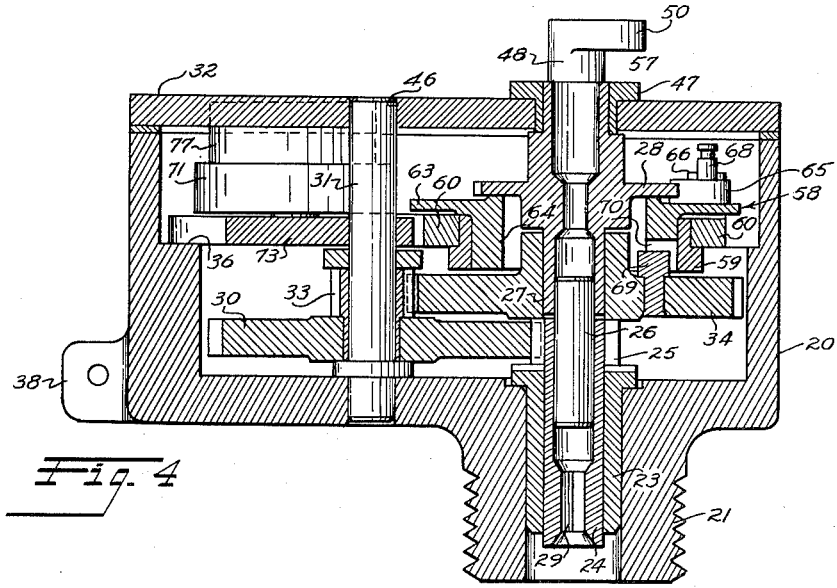
Figure 4 is a vertical sectional view taken substantially on the line 4—4 of Figure 3.
Figure 5:
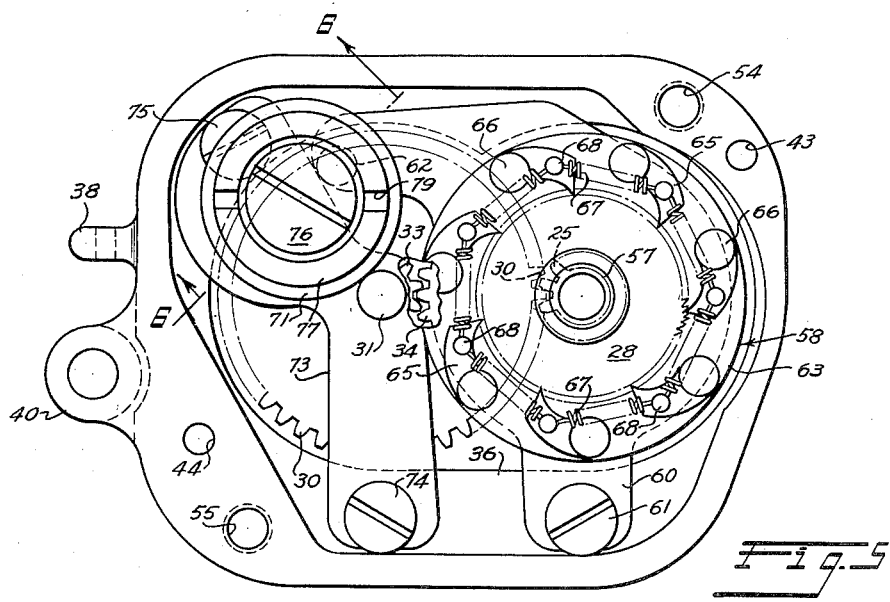
Figure 5 is a top plan view of the gear box, the cover plate thereof being removed.
Figure 6:
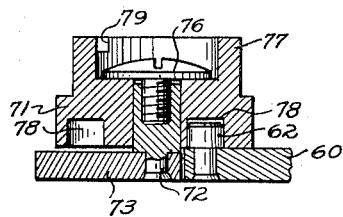
Figure 6 is a detail vertical sectional view taken substantially on the line 6—6 of Figure 5.

In order to enable the basic principle of the invention to be readily understood, before describing the concrete embodiment of the invention, a brief explanation of the operation of its fundamental components which induces small increments of change in the drive ratio will first be given in connection with Figures 1 and 2 of the drawings. In these diagrams, a pair of ratchet pawls 10 and 11 of equal length are respectively pivoted to relatively opposite ends of a tie bar 12 which is shiftable in the direction of its length diametrically of a ratchet 13 and disposed in a plane, intersecting the axis of said ratchet. As seen in Figure 1, the pivot points of the ratchet pawls are equi-distantly spaced from the ratchet and each pawl at its free end is in driving mesh with the ratchet teeth. Accordingly, the dimensions A to B, A to C and B to C of both the upper and lower ratchet pawl assemblies are respectively equal.

In the diagram of Figure 2 of the tie rod 12 has been moved downwardly, slightly changing the dimensions A to B and B to C and thereby advancing the ratchet wheel clockwise for a distance of one-half tooth from the point of Figure 1 and shifting the center of the tie rod from the axis 14 of the ratchet 13 to the point 15. While the top pawl 10 is advancing the ratchet in clockwise direction, the bottom pawl 11 at its contact with the ratchet teeth is retarded in counterclockwise direction at an equal rate, allowing the pawl to drop in behind the next ratchet tooth. This retarding action on the lower pawl is due to the fact that the dimensions A to B and B to C are in an inverse order to those of the top pawl 10.

If the tie rod 12 is now revolved about its axis point 15 to cause the pawls 10 and 11 to alternatively drive the ratchet 13 on its axis 14, it will be obvious that due to the eccentric position of the respective pawl pivots in relation to the axis of the ratchet the point of pawl 11 will actually be accelerated while the point of pawl 10 will be decelerated for one-half a revolution. It is thus seen that each full revolution of the tie rod will result in one full revolution of the ratchet plus the chord equal to one tooth since each half revolution advances the ratchet one-half tooth.

For effective operation, the two ratchet pawls must operate alternately to advance the ratchet and also, each half revolution of the tie rod must advance the ratchet at least one-half tooth or multiples thereof. Anything less will produce only a back and forth rocking motion resulting in a 1 to 1 ratio. In the present example of a ratchet having 20 teeth it is thus apparent that 20 revolutions of the ratchet pawl assemblies will produce 21 revolutions of the ratchet. If the eccentricity of the ratchet pawl assemblies with relation to the ratchet is increased sufficiently to advance the ratchet one full tooth with each half revolution, the ratio would then be 20 to 22. Under this condition each ratchet pawl alternately advances the ratchet a distance of one tooth and is then decelerated to engage the second following tooth. In 20 revolutions, the ratchet is advanced 20 times, two teeth per revolution or 40 teeth, the equivalent of two additional revolutions of the ratchet.

The ratio can be further reduced by increasing the number of ratchet teeth and when a limit has been reached, further reduction in ratio can be obtained by the addition of ratchet pawls symmetrically positioned around the ratchet on a disk. For example, by adding another pair of ratchet pawl assemblies in the diagram of Figure 1, displaced 90° from those illustrated, the ratchet would then be advanced for one-quarter tooth in each half of revolution of the pawl assemblies.

In Figures 3 to 8 inclusive of the drawings I have shown one practical application of the above described principle of variable ratio drive to a taximeter gear reduction box. In this embodiment of the invention as illustrated in Figure 3, the gear box 20 has a depending boss 21 formed on its bottom wall which is externally threaded to receive the coupling nut 22 for a primary flexible speedometer drive shaft. As shown in Figure 4, the boss 21 has an axial bore in which a bearing sleeve 23 is received with a press fit. Sleeve 23 provides a journal for a sleeve 24 upon which a pinion 25 is formed integrally upon the upper end. The sleeve 24 has an axial bore, the wall of which at its upper end provides an interference fit with the pilot pin 26 for the integral hub 27 of a ratchet 28 to be presently described in further detail. The lower end 29 of the bore in sleeve 24 is non-circular in cross-section to receive a conventional type of adapter coupling drivingly connecting said sleeve with the primary flexible speedometer drive shaft.

Pinion 25 is in constant mesh with an intermediate gear 30 journalled for rotation upon a stationary vertical shaft 31 rigidly secured in the bottom wall of the gear box and having its upper end mounted in the cover plate 32 of the gear box. A pinion 33 is rigidly secured to gear 30 in concentric relation therewith and is in constant mesh with a gear 34 journalled for rotation upon the lower hub portion 27 of the ratchet 28, said ratchet hub 27 being bored to receive the upper end of the pilot pin 26. This intermediate gear train precedes the adjustable ratio drive mechanism which determines the variable speed of rotation between the power input sleeve 24 and the power output or take off shaft connected with ratchet 28.

The body wall of the gear box intermediate of its upper and lower ends is internally formed with a ledge or shoulder 36 for a purpose which will presently be explained. The gear box at one end thereof is also provided with a laterally projecting apertured lug 38 in the plane of its bottom wall, and above said lug, at the upper open side of the box body, with an apertured screw receiving boss 40.

As shown more clearly in Figure 8 of the drawings, the gear box cover plate 32 is provided with dowel pins 41 and 42 properly located to fit accurately located drilled openings 43 and 44 respectively in the body wall of the gear box, and thus fix the location of the apertures 45 and 46 respectively and bearing 47 to correspond with the fixed locations of the component elements of the mechanism mounted within the gear box. Additional studs 48 and 49 are securely riveted to the cover plate 32 and provided at their upper ends with bayonet lugs 50 and 51 for insertion through arcuate openings in the bottom wall of the meter housing (not shown) whereby the gear box is securely attached to said housing. Counterbored openings 52 and 53 are also provided in cover plate 32 and receive screws for threaded engagement in the tapped holes 54 and 55 in the side wall of the gear box.

The cover plate 32 is further secured to the body wall of the gear box by means of a headed screw (not shown) inserted upwardly through the apertured boss 40 and an opening in the laterally projecting boss 56 on one end of the plate 32 and then threaded into a collar internally secured to the base wall of the meter housing. The screw head is then connected with the apertured lug 38 on the gear box wall by means of the conventional wire seal (not shown).

The upper end of the fixed shaft 31 is guided in the opening 46 in cover plate 32 and the upper hub extension 57 of ratchet 28 is journalled for rotation on a fixed axis within the bearing member 47 on the cover plate 32. Ratchet hub 57 is adapted to be drivingly connected by means of the conventional adapter coupling (not shown) with the drive shaft of a taximeter.

A pawl disk assembly 58 is journalled for rotation in a bushing 59 carried by a supporting member 60 which is pivotally mounted at one of its ends by means of a shouldered screw 61 upon the ledge or shoulder 36 on the body wall of the gear box. This supporting member at its other end carries a cam follower 62.

The pawl disc assembly 58 includes a disk 63 having a hub 64 journalled in the bushing 59, and upon said disc seven pawls 65 are journalled at one of their ends for rotation upon elongated shouldered studs 66 concentrically spaced about the axis of disk 63. These pawls are interconnected by springs 67 secured at their ends to anchoring studs 68 on the respective pawls and which urge the spaced pawl assemblies at their free ends into constant engagement with the periphery of the 90 tooth ratchet 28 so that at least one of said pawls is in full driving engagement with a tooth on the ratchet at any given instant. As 90, the number of teeth, is not divisible by 7, the number of pawls, only one of the pawls can be in full meshed engagement to drive the ratchet when the pawl assemblies are concentric with the ratchet. A stud 69 on gear 34 is drivingly engaged in a notch or recess 70 in the hub 64 of disk 63.

The means for eccentrically adjusting the pawl disk assembly relative to the aligned axes of sleeve 24 and ratchet 28 comprises a cam 71 which is journalled on a stud 72 securely riveted to a plate 73 bridging the interior of the gear box and rigidly fixed thereto on the ledge 36 by means of the screws 74 and 75. The cam 71 is locked in its angularly adjusted position by means of a screw 76 engaged in an axially threaded bore of the stud 72 and having a clamping head disposed within an annular flange 77 formed on the cam and positioned within the opening 45 in the cover plate 32 of the gear box. As is shown in Figure 7 the cam 71 is provided with a spiral cam track 78 in which the follower 62 on supporting member 60 is engaged while the flange 77 is provided with screw driver receiving slots 79 for conveniently rotating the cam member 71 upon stud 72. The opening 45 in the cover plate 32 affords easy access for the purpose of making this adjustment which cannot be changed or altered unless the gear box is first detached from the base of the taximeter housing which requires the breaking of the wire seal.

From the above description, it will readily be understood that small increments of change in the driving speed ratio between input sleeve 24 and the ratchet 28 may be readily obtained by angularly adjusting the cam member 71 to eccentrically shift the position of the pawl disk assembly 58 with respect to the common axes of said sleeve 24 and ratchet 28. By then rigidly securing the cam 71 in its adjusted position by means of screw 76 such predetermined driving speed ratio will be maintained over a long running period. Thus by means of the present invention, without the use of interchangeable gear trains, compensation may be readily made in the gear box unit for changes in allowable deficiency or excess errors, resulting in over-registration and under-registration respectively; final axle drive gearing of different ratios, and a wide range of different tire sizes. It will further be seen that the present invention provides a very simple and highly compact assembly of the variable ratio drive mechanism within the gear box so that interchangeable boxes of comparatively small dimensions may be provided for attachment to the taximeter housings of different vehicles. Also the several cooperating mechancial elements of the drive mechanism are of simple structural form, conducing to relatively low production costs and insuring the positive and efficient functional operation thereof.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a variable ratio drive mechanism, a housing, driving and driven shafts rotatably mounted in said housing, a ratchet disk fixed to one of said shafts, a pivoted support, a plurality of pawls circumferentially spaced about the other of said shafts and in constant engagement with the teeth of said ratchet disk, means mounting said pawls upon said support for conjoint rotary movement with respect thereto, means drivingly connecting said drive shaft with said mounting means and manually operable means for pivotally adjusting said support to eccentrically position said mounting means and said pawls relative to said ratchet disk, comprising a plate rigidly mounted within said housing substantially coplanar with said pivoted support, a stud upon said plate, a cam mounted upon said stud and having a grooved cam track overlying a portion of said pivoted support, a cam follower on said pivoted support and extending from the plane of said support into said grooved cam track, and means on said stud for rigidly securing said cam in any adjusted angular position.

2. In a variable ratio drive mechanism, coaxial driving and driven shafts, a ratchet disk fixed to said driven shaft, a pivoted support, a plurality of pawls circumferentially spaced about said driven shaft in constant engagement with the teeth of said ratchet disk, means mounting said pawls upon said support for unitary rotary movement with respect thereto, means drivingly connecting said drive shaft with said mounting means comprising a speed reducing gear train including a gear coaxial with said driving and driven shafts and drivingly connected with said mounting means, and manually operable means for pivotally adjusting said support to eccentrically position said mounting means and said pawls relative to said ratchet disks, comprising a plate rigidly mounted within said housing substantially coplanar with said pivoted support, a stud upon said plate and parallel but spaced from the axes of said shafts, a cam mounted upon said stud and having a grooved cam track overlying a portion of said pivoted support, a cam follower on said pivoted support and extending from the plane of said support into said grooved cam track, and means on said stud for rigidly securing said cam in any adjusted angular position.

3. In a variable ratio drive mechanism, coaxial driving and driven members independently rotatably mounted, a ratchet disk fixed to said driven member; a pivoted support; a plurality of pawls circumferentially spaced about the axis of rotation of said driven member in constant engagement with the teeth of said ratchet disk; means mounting said pawls upon said support for unitary rotary movement with respect thereto comprising a disk journalled upon said support in parallel relationship with the ratchet disk, means pivotally mounting said pawls on said journalled disk, and spring means interconnecting said pawls and constantly urging the same into driving engagement with said ratchet; means drivingly connecting said driving member and said mounting means for unitary rotation while maintaining said mounting means free of restraint against radial displacement, and manually operable means for pivotally adjusting said support to eccentrically position said mounting means and said pawls relative to said ratchet disk.

4. In a variable ratio drive mechanism, coaxially aligned driving and driven members independently rotatably mounted, a ratchet disk fixed to said driven member, a pivoted support, a plurality of pawls circumferentially spaced about said driven member and all in constant engagement with the teeth of said ratchet disk, means mounting said pawls upon said support for unitary rotary movement with respect thereto, means drivingly connecting said driving member and said mounting means for unitary rotation while maintaining said mounting means free of restraining against radial displacement, and manually operable means for pivotally adjusting said support to eccentrically position said mounting means and pawls relative to said ratchet disk comprising a cam rotatably adjustable about an axis in spaced parallel relation to said driving and driven members, a follower mounted on said support in engagement with said cam and means for rigidly securing said cam in its adjusted position.

5. In a variable ratio drive mechanism for taximeters, a gear box having means for attachment to a taximeter housing; coaxially aligned driving and driven members independently rotatably mounted, input and output shafts journalled respectively in the bottom and top walls of said gear box in axial alignment with said members, means drive connecting said input and output shaft to said drive and driven members respectively, speed ratio changing means comprising a ratchet disk fixed to said driven member and a multiple pawl assembly constantly engaged with said ratchet disk; means drivingly connecting said assembly with said driving member for rotation relative to said member; and manually adjustable means mounted in said gear box and operatively connected with said pawl assembly to eccentrically position said assembly relative to said ratchet disk and establish a predetermined driving speed ratio between said driving and driven members including a supporting member pivotally mounted in the gear box upon which said multiple pawl assembly is rotatably mounted, a manually adjustable cam having a groove mounted in said gear box, and a follower on the said supporting member in constant operative engagement with the groove in said cam.

6. In a variable drive mechanism for taximeters, a gear box having means for attachment to a taximeter housing, coaxially aligned driving and driven shafts journalled respectively in the bottom and top walls of said gear box, motion transmitting connections between said shafts including a speed reducing gear train having a gear element rotatable relative to said shaft in coaxial relation therewith, speed ratio changing means comprising a ratchet disk fixed to said driven shaft and an assembly comprising a circumferential series of pawls pivoted on said disc all constantly engaged with said ratchet disk, means drivingly connecting said assembly with said gear element for rotation relative to said shaft, and manually adjustable means mounted in said gear box operatively connected to said pawl assembly to eccentrically position said assembly relative to said ratchet disk and establish a predetermined driving speed ratio between said driving and driven shafts, said multiple pawl assembly including a disk directly driven by said gear element and rotatably mounted upon a part of said adjustable means, and spring means interconnecting and urging said pawls into effective engagement with said ratchet disk.

7. In a variable drive mechanism for taximeters, a gear box having means for attachment to a taximeter housing; coaxially aligned driving and driven shafts journalled respectively in the bottom and top walls of said gear box; motion transmitting connections between said shafts including a speed reducing gear train having a gear element rotatable relative to said shafts in coaxial relation therewith; speed ratio changing means including a ratchet disk fixed to said driven shaft and a multiple pawl assembly constantly engaged with said ratchet disk; means drivingly connecting said assembly with said element for rotation relative to said shaft; and manually adjustable means mounted in said gear box operatively connected with said pawl assembly to eccentrically position said assembly relative to the ratchet disk and establish a predetermined driving speed ratio between said driving and driven shafts; said multiple pawl assembly comprising a disk directly driven by said gear element and rotatably mounted upon a part of said adjustable means, a plurality of pawls pivotally mounted on said disk in circular arrangement and all constantly engaged with said ratchet, and spring means interconnecting and urging said pawls into effective engagement with said ratchet disk; and said adjustable means including a manually operable member mounted in said gear box and operatively connected with said part of said adjustable means.

References Cited in the file of this patent

UNITED STATES PATENTS

| Number | Name | Date |
| --- | --- | --- |
| 787,830 | Conant | Apr. 18, 1905 |
| 1,043,176 | Volkening | Nov. 5, 1912 |
| 1,355,607 | Janicki | Oct. 12, 1920 |
| 1,608,922 | Bockius | Nov. 30, 1926 |
| 2,014,954 | Sheridan | Sept. 17, 1935 |

FOREIGN PATENTS

| Number | Country | Date |
| --- | --- | --- |
| 48,414 | Germany | Sept. 7, 1889 |
| 203,513 | Switzerland | June 1, 1939 |
| 250,662 | Great Britain | Apr. 15, 1926 |